(12) United States Patent
Moreau et al.

(10) Patent No.: US 10,834,944 B2
(45) Date of Patent: Nov. 17, 2020

(54) RETORT LOAD/UNLOAD SYSTEM AND METHOD

(71) Applicant: ALLPAX PRODUCTS LLC, Covington, LA (US)

(72) Inventors: Beau R. Moreau, Lacombe, LA (US); Philip M. LeBlanc, Franklinton, LA (US)

(73) Assignee: ALLPAX PRODUCTS LLC, Covington, LA (US)

( * ) Notice: Subject to any disclaimer, the term of this patent is extended or adjusted under 35 U.S.C. 154(b) by 426 days.

(21) Appl. No.: 15/701,911

(22) Filed: Sep. 12, 2017

(65) Prior Publication Data

US 2018/0070615 A1 Mar. 15, 2018

Related U.S. Application Data

(60) Provisional application No. 62/394,276, filed on Sep. 14, 2016.

(51) Int. Cl.
| | |
|---|---|
| *A23L 3/005* | (2006.01) |
| *A23L 3/02* | (2006.01) |
| *A23L 3/00* | (2006.01) |
| *A23L 3/10* | (2006.01) |
| *B65B 55/06* | (2006.01) |
| *F16G 13/20* | (2006.01) |
| *F16G 1/28* | (2006.01) |
| *F16H 19/06* | (2006.01) |
| *B01J 3/04* | (2006.01) |
| *B01J 3/03* | (2006.01) |
| *G01N 35/04* | (2006.01) |

(52) U.S. Cl.
CPC .............. *A23L 3/001* (2013.01); *A23L 3/10* (2013.01); *B01J 3/03* (2013.01); *B01J 3/042* (2013.01); *B65B 55/06* (2013.01); *F16G 1/28* (2013.01); *F16G 13/20* (2013.01); *F16H 19/0636* (2013.01); *G01N 2035/0415* (2013.01); *G01N 2035/0465* (2013.01)

(58) Field of Classification Search
CPC .................................................. A23L 3/00–14
USPC ................................................... 99/359–371
See application file for complete search history.

(56) References Cited

U.S. PATENT DOCUMENTS

| | | | |
|---|---|---|---|
| 682,100 A | 9/1901 | Matthews | |
| 904,966 A | 11/1908 | Knoch | |
| 1,925,194 A | 9/1933 | Long | |
| 2,375,461 A | 5/1945 | Bender | |
| 2,554,300 A | 5/1951 | Hayakawa | |
| 2,697,665 A * | 12/1954 | Olson | ........ A23L 3/14 99/361 |
| 3,612,299 A | 10/1971 | Shaw et al. | |

(Continued)

*Primary Examiner* — Michael A Laflame, Jr.
(74) *Attorney, Agent, or Firm* — Thompson Hine LLP

(57) ABSTRACT

A retort system includes a vessel having an access opening accessible via a movable door, a basket supporting assembly within the vessel and along which container baskets are movable for loading into the vessel and unloading from the vessel and a heating system for heating containers for treatment within the vessel. A container basket load/unload system moves container baskets into the vessel and for moving container baskets out of the vessel, and includes a rigid chain unit aligned or alignable with the access opening such that a rigid chain can be moved along a chain feed path into the vessel via the access opening.

24 Claims, 17 Drawing Sheets

(56) References Cited

U.S. PATENT DOCUMENTS

| | | |
|---|---|---|
| 3,627,477 A * | 12/1971 | Beauvais ............... A23L 3/04 422/296 |
| 3,878,947 A * | 4/1975 | Bayly ............... F27B 7/3205 414/149 |
| 3,918,598 A | 11/1975 | Van der Meer et al. |
| 3,984,289 A * | 10/1976 | Sustarsic ............... C10B 33/003 202/262 |
| 4,029,198 A | 6/1977 | Lingl, Jr. |
| 4,436,470 A | 3/1984 | Spletzer et al. |
| 4,561,817 A | 12/1985 | Spletzer et al. |
| 4,661,325 A * | 4/1987 | Noro ............... A23L 3/04 414/157 |
| 4,997,691 A | 3/1991 | Parkinson |
| 5,091,231 A | 2/1992 | Parkinson |
| 5,184,542 A * | 2/1993 | Bottino ............... F26B 15/10 198/465.3 |
| 6,224,037 B1 | 5/2001 | Novick |
| 6,739,108 B2 | 5/2004 | Blattner et al. |
| 7,104,465 B2 | 9/2006 | Persoons et al. |
| 7,270,619 B2 | 9/2007 | Bourc'His |
| 8,276,326 B2 | 10/2012 | Lounis et al. |
| 8,596,946 B2 | 12/2013 | Lydle |
| 9,364,376 B2 | 6/2016 | Crawford et al. |
| 2003/0041614 A1 * | 3/2003 | Burn ............... F25D 13/067 62/380 |
| 2003/0234095 A1 * | 12/2003 | Usui ............... A61C 13/20 164/336 |
| 2005/0123435 A1 * | 6/2005 | Cutler ............... A23L 3/001 422/1 |
| 2007/0289861 A1 * | 12/2007 | Barkdoll ............... C10B 31/10 201/8 |
| 2010/0126988 A1 * | 5/2010 | Mackay ............... A23L 3/01 219/700 |
| 2010/0129511 A1 * | 5/2010 | Lambert ............... A23L 3/12 426/394 |
| 2014/0193548 A1 * | 7/2014 | Godoy Varo ......... A23L 3/0155 426/231 |

* cited by examiner

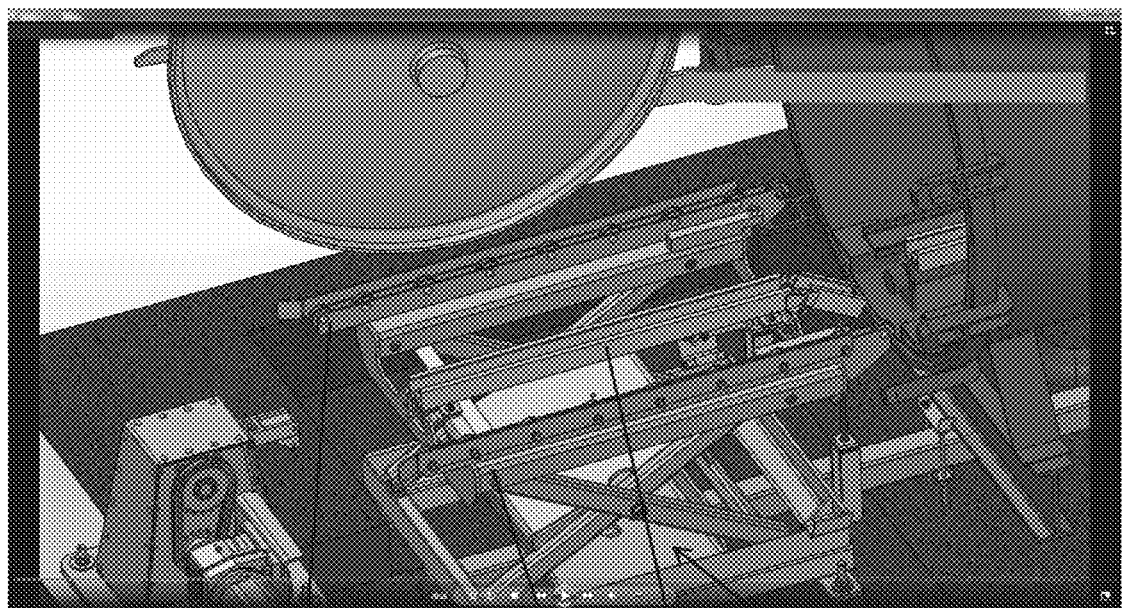
Fig. 13    62    62    48    70
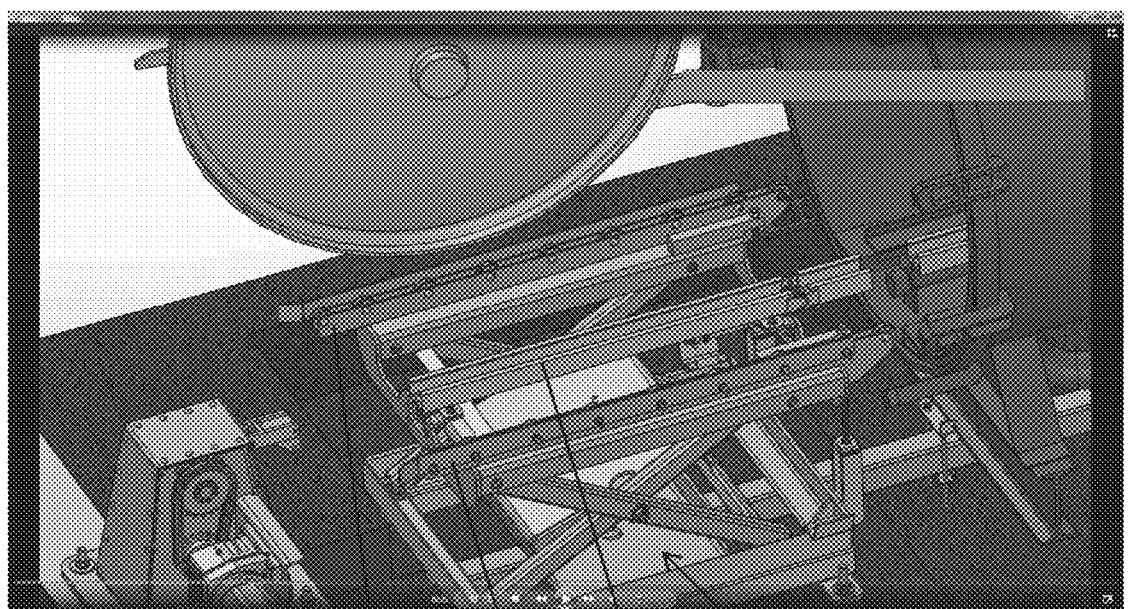
Fig. 14    62    62    48    70

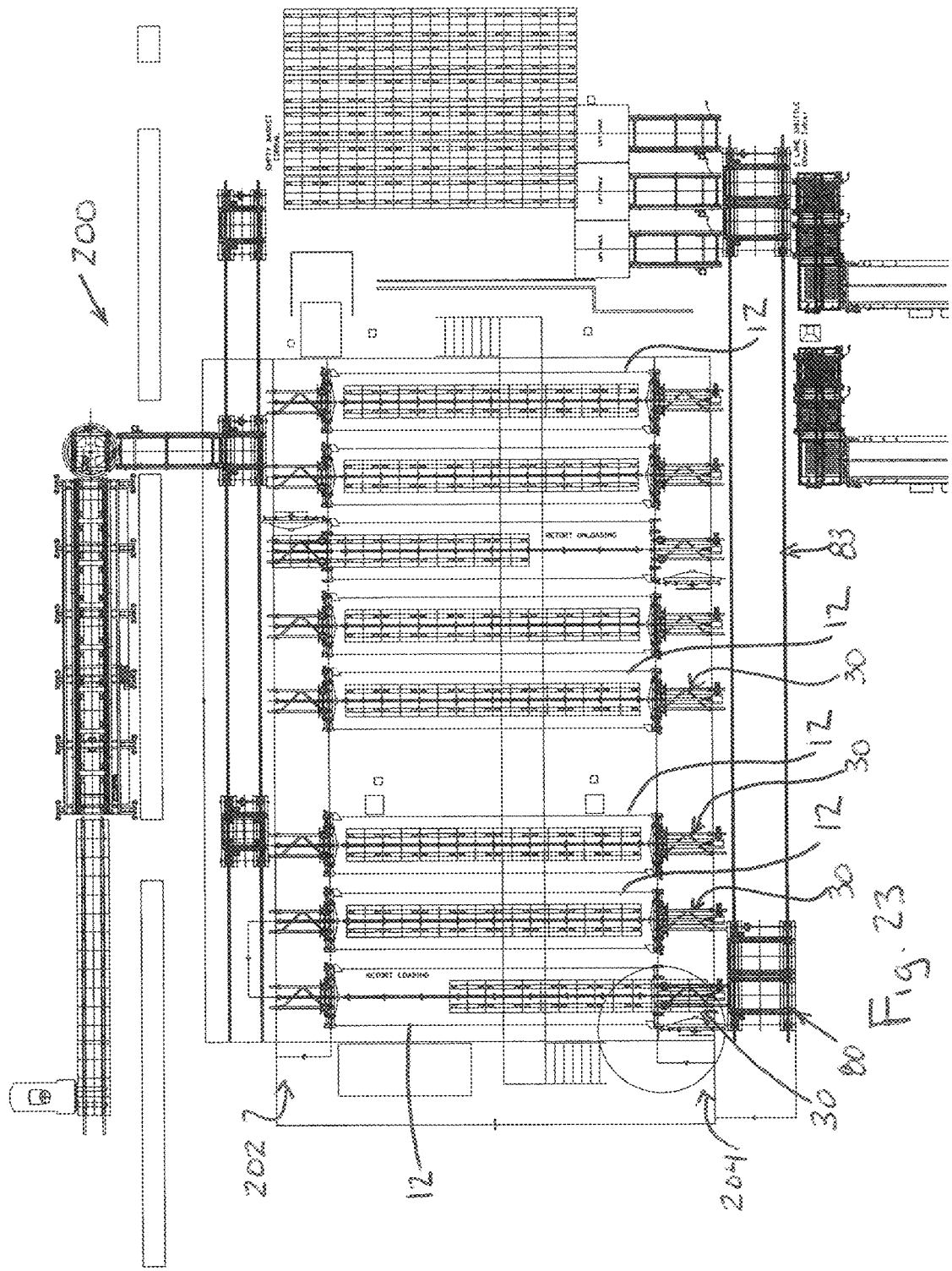

# RETORT LOAD/UNLOAD SYSTEM AND METHOD

CROSS-REFERENCES

This application claims the benefit of U.S. Application Ser. No. 62/394,276, filed Sep. 14, 2016, which is incorporated herein by reference.

TECHNICAL FIELD

This application relates to devices for use in connection with sterilization autoclaves (known in the industry as retorts), and in particular to a system and method for automated loading and unloading of retort vessels.

BACKGROUND

To sterilize many foods, pharmaceuticals and other products, to make them "shelf-stable," the products are subjected to a sterilization method by heating the food in its sealed container to a predetermined temperature. The product is held at this temperature for a product specific duration. This process is commonly referred to as an autoclave process, retort process or a sterilization process.

A retort is a pressure vessel commonly used in the food industry for pasteurization and sterilizing low acid food in the container.

Water spray retorting and water cascade retorting are both acceptable commercial processes available in the food industry suitable to run process designed for pasteurizing and sterilizing containers requiring overpressure to ensure integrity of the container. Steam may also be used for heating the product in the retort. Compressed air is used to develop overpressure in the retort throughout the process to offset the pressure differential inside the container.

Loading and unloading of container baskets from retort vessels can be cumbersome, particularly if done manually. Because conditions within retort vessels can be considered extreme or hazardous, avoiding personnel entry into the retort vessel during loading and unloading is desirable.

SUMMARY

In one aspect, a retort load/unload system utilizes a rigid chain unit.

In another aspect, a retort system includes a vessel having an access opening accessible via a movable door, a basket supporting assembly within the vessel and along which container baskets are movable for loading into the vessel and unloading from the vessel and a heating system for heating containers for treatment within the vessel. A container basket load/unload system moves container baskets into the vessel and for moving container baskets out of the vessel, and includes a rigid chain unit aligned or alignable with the access opening such that a rigid chain can be moved along a chain feed path into the vessel via the access opening.

In a further aspect, a retort system includes a plurality of retort vessels positioned side-by-side, each retort vessel having an access opening accessible via a movable door. At least one rigid chain unit is providing for loading and unloading of the retort vessels.

In yet another aspect, a method of loading a retort vessel with one or more container baskets involves: (a) positioning a first container basket at a location exterior of a vessel and in alignment with an access opening at one end of the retort vessel; (b) extending a rigid chain toward the first container basket to cause a basket push block to engage with the first container basket and move the first container basket toward the access opening, through the access opening and into the retort vessel; and (c) retracting the rigid chain from the retort vessel.

In still another aspect, a method of retort operation involves: (a) loading multiple container baskets into a retort vessel utilizing a rigid chain that feeds from a position exterior of the retort vessel and into the retort vessel; (b) after step (a), closing the retort vessel; (c) after step (b), heating containers within the multiple container baskets within the retort vessel; (d) after step (c), opening the retort vessel; and (e) after step (d), unloading the multiple container baskets from the retort vessel utilizing the rigid chain.

The details of one or more embodiments are set forth in the accompanying drawings and the description below. Other features, objects, and advantages will be apparent from the description and drawings, and from the claims.

BRIEF DESCRIPTION OF THE DRAWINGS

FIGS. 11-22 depict one embodiment of a sequence of retort loading; and

FIG. 23 shows a top plan view of one embodiment of a retort system with multiple retort vessels.

DETAILED DESCRIPTION

Figure 1:
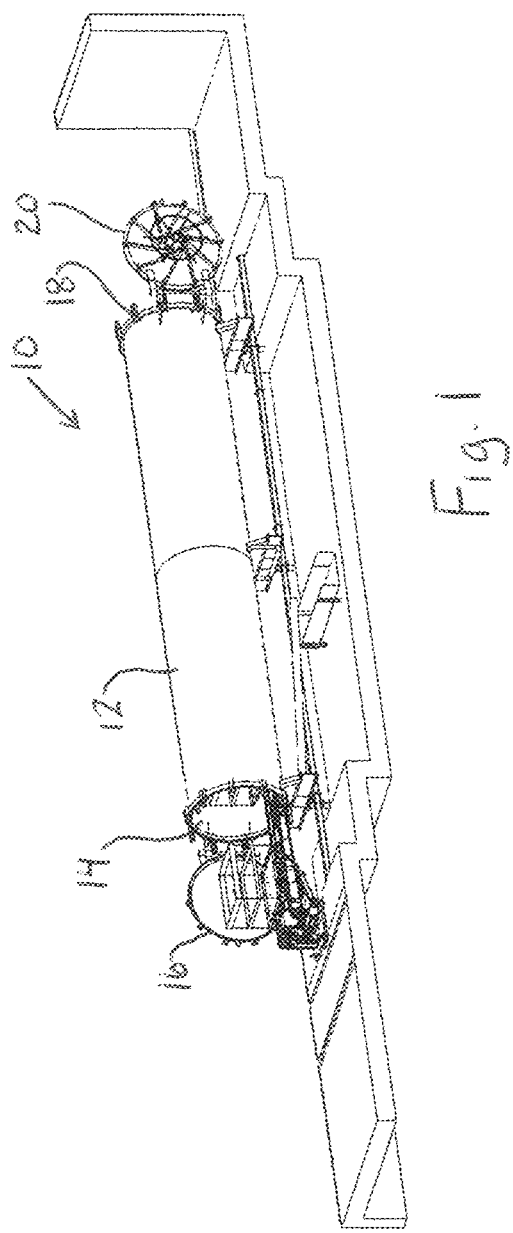
FIG. 1 shows a perspective view of a retort system with a basket load/unload system.
Figure 2:
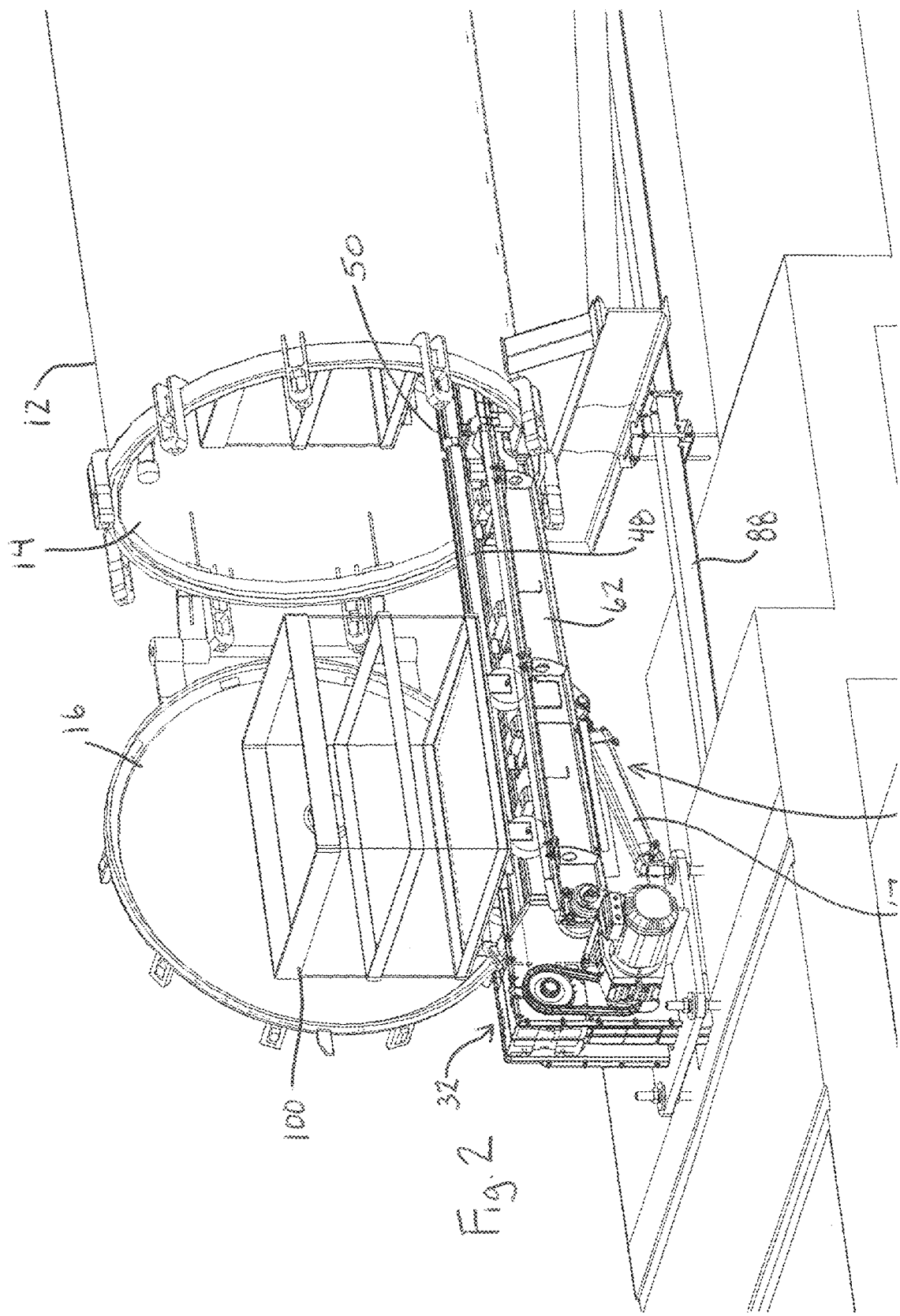
FIG. 2 shows an enlarged partial perspective of the load side of the retort system of FIG. 1.
Figure 3:
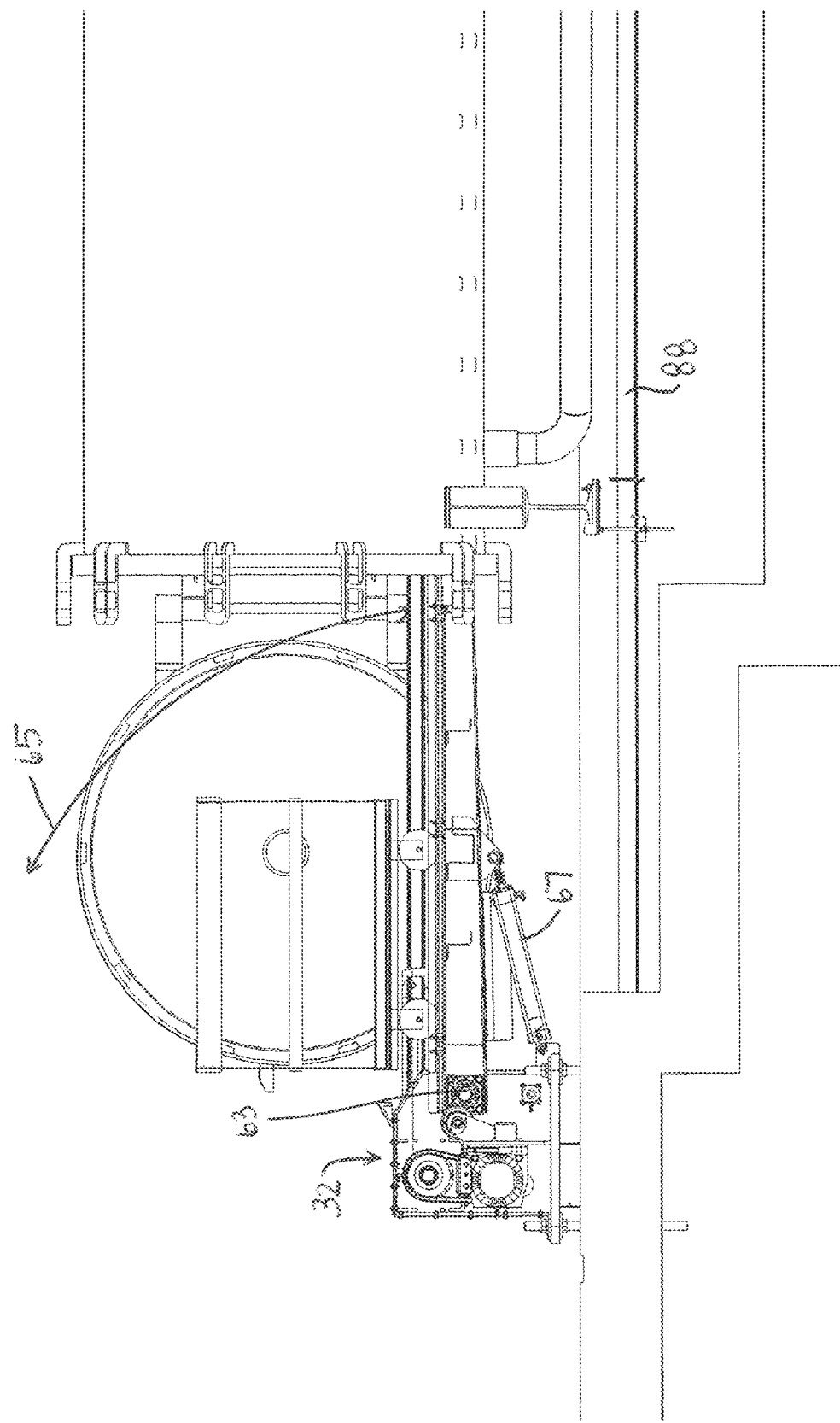
FIG. 3 shows an enlarged partial side elevation of the load side.

Referring to FIGS. 1-7, a retort system 10 is shown and includes an elongated retort vessel 12 having an access opening 14 at one end and accessible via a movable door 16, and an access opening 18 at an opposite end and accessible via a movable door 20. Here the doors pivot laterally (e.g., rotating about a vertical hinge axis), but other systems are possible such as doors that move in vertical plane (e.g., orbiting about a horizontal axis). A basket supporting assembly 22 within the vessel may take the form of a rail system along which container baskets 100 are movable for loading into the vessel and unloading from the vessel. In the case of the illustrated retort vessel 12 baskets may be moved in one end and out of the other end. In the case of a retort vessel with only one access opening the baskets would be moved in and out of the same access opening.

The retort vessel 12 includes a heating system for heating containers for treatment within the vessel. The heating system may be of any suitable type capable of heating containers within baskets that are loaded into the vessel (e.g., hot water spray, hot water cascade and/or steam).

A container basket load/unload system 30 is provided for moving container baskets into the vessel and for moving container baskets out of the vessel. The system includes a rigid chain unit 32 (e.g., such as available from Serapid USA in Sterling Heights, Mich. or other manufacturers) aligned with the access opening 14 such that a retractable rigid chain 34 can be extended and moved along a chain feed path 36 into the vessel via the access opening. The rigid chain unit 32 includes a chain feed mechanism 40 (e.g., driven by a motor with chain or drive belt) and a pusher block 42 disposed proximate a push end of the rigid chain 34. The pusher block may be pivotably connected to the rigid chain for movement between a basket push position (e.g., raised to engage and push container baskets) and a basket bypass position (e.g., lowered to allow container baskets to pass thereover).

The container basket load/unload system 30 also includes a chain guide channel 44 running along the chain feed path from a position exterior of the vessel and into the vessel. The chain guide channel 44 interacts with the rigid chain to maintain an extended portion of the rigid chain that is within the chain guide channel substantially linear to enable the pushing function. The chain guide channel includes a channel portion 46 fixed to the rigid chain unit, a channel portion 48 aligned with portion 46 and located primarily exteriorly of the vessel and one or more channel portions 50 located within the vessel. The channel portion 48 is movable (as will be described in further detail below) between a load/unload position that prevents closure of the door of the vessel and a retracted position that permits closure of the door of the vessel.

The container basket load/unload system 30 includes spaced apart basket support rail lines 60 running parallel to the chain feed path, where each basket support rail line 60 runs from a position exterior of the vessel and into the vessel. Each basket support rail line 60 includes a rail portion 62 located primarily exteriorly of the vessel (which may include rail portion 62 being completely exterior or the vessel) and a rail portion 64 located within the vessel. Like the channel portion 48, the rail portions 62 are movable between a load/unload position that prevents closure of the door of the vessel and a retracted position that permits closure of the door of the vessel.

Figure 4:
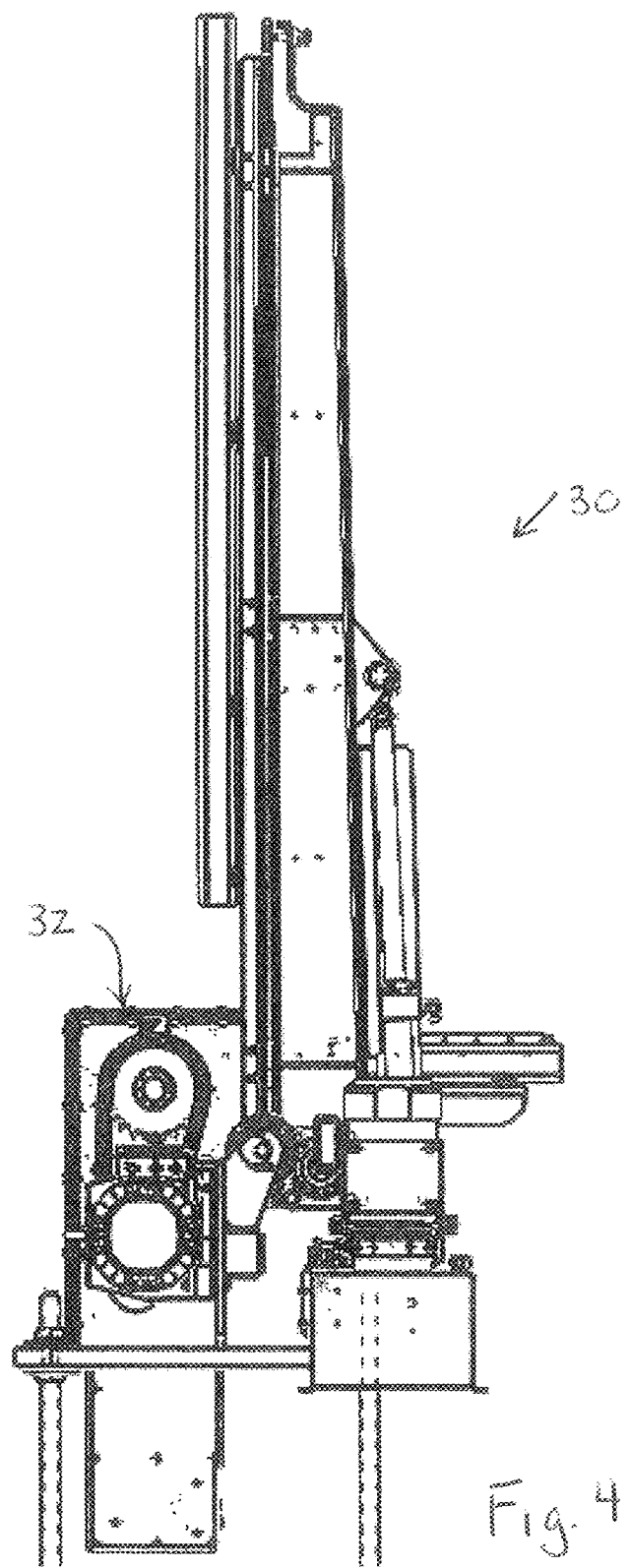
FIG. 4 shows a side elevation of a load/unload frame pivoted upward.
Figure 5:
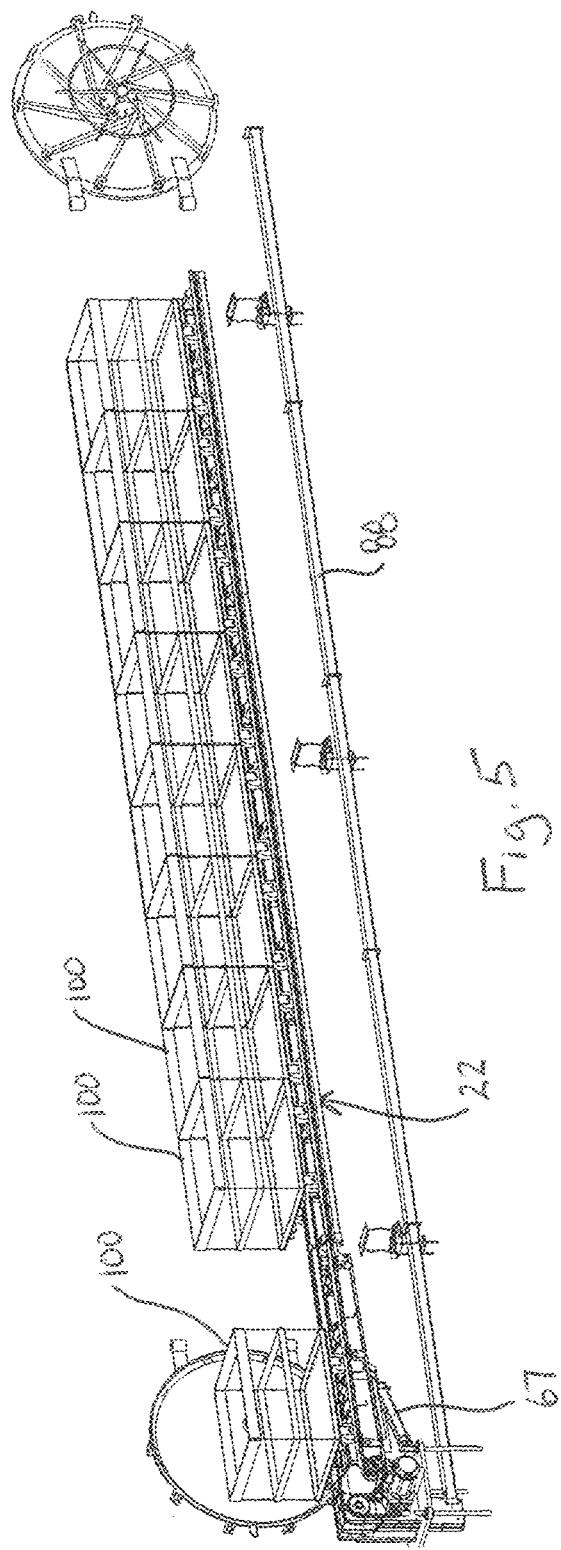
FIG. 5 shows a perspective view of the retort system with retort vessel not shown.
Figure 6:
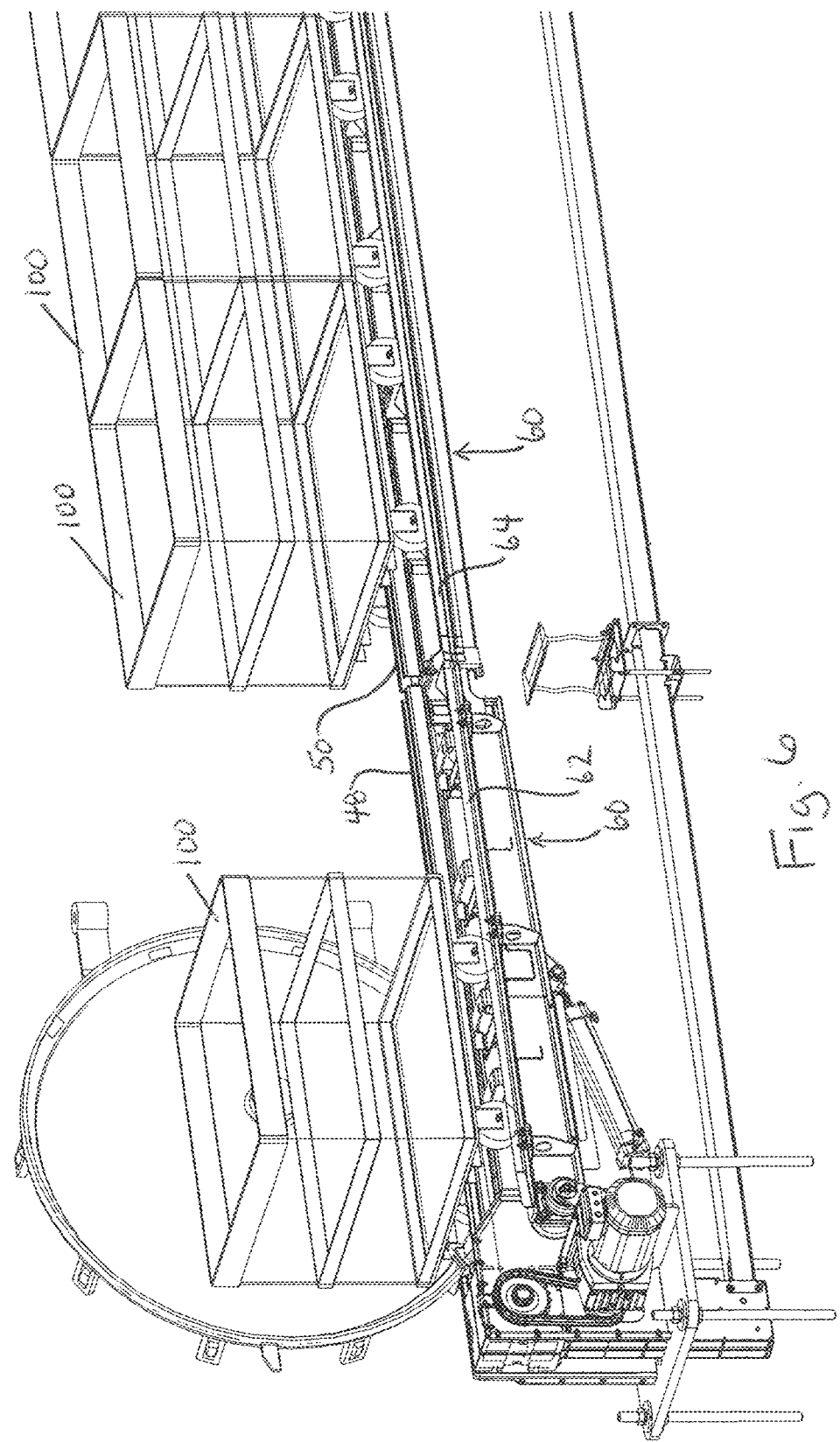
FIG. 6 shows an enlarged partial perspective of the load side of FIG. 5.
Figure 7:
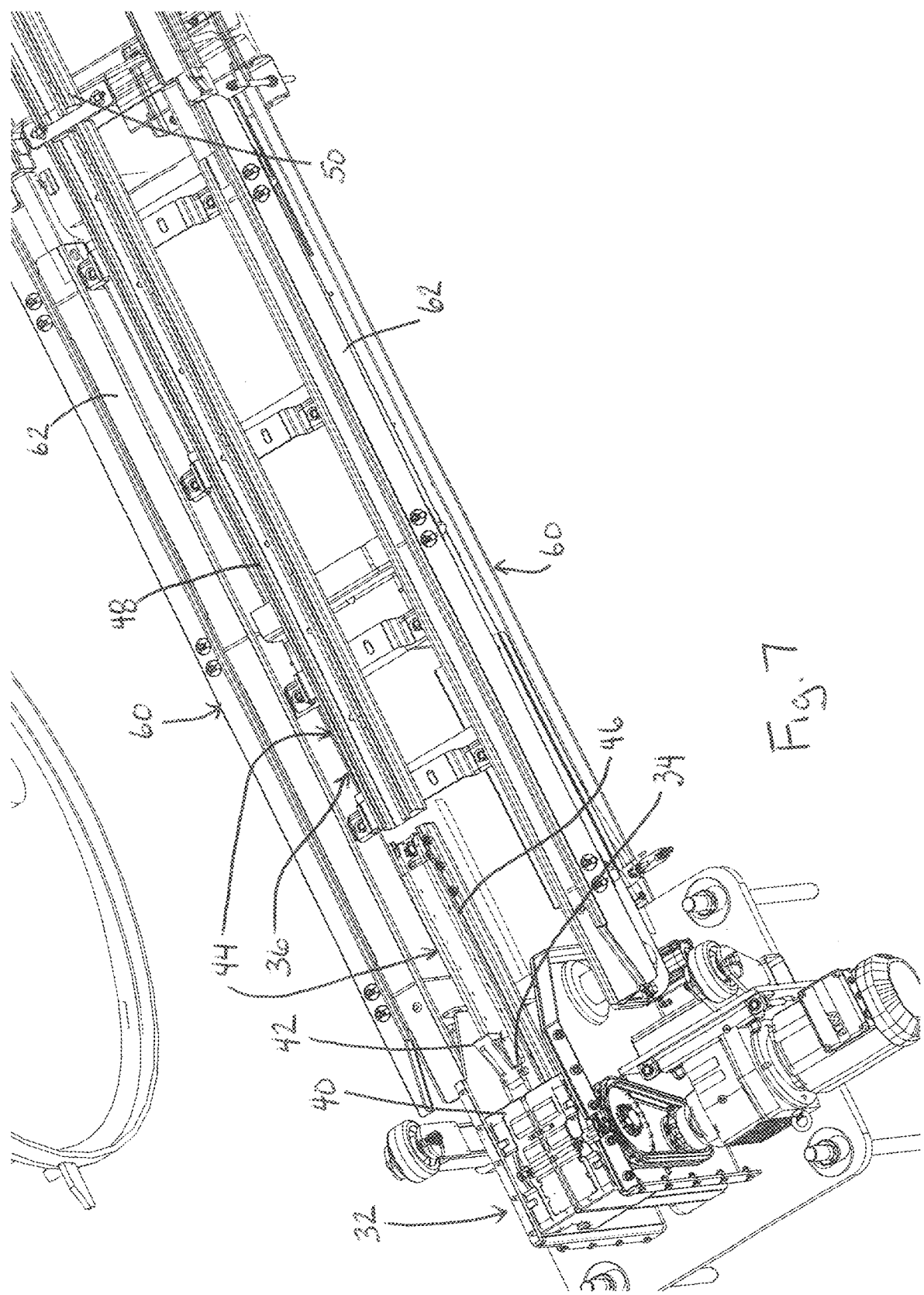
FIG. 7 shows another perspective of the load side.

In one embodiment, movement of the channel portion 48 and rail portions 62 between the load/unload positions and the retracted position is achieved by mounting of the respective portions to a frame that is pivotably movable about a pivot axis 63 along an arcuate path 65 between a lowered lateral load/unload position (FIG. 3) and the upright retracted position (FIG. 4). The pivoting frame is movable by a linear actuator 67, and together the system forms a common actuation assembly for movement of the channel and rail portions. The frame, channel portion and rail portions collectively can be considered a pivotable basket support bridge that is useful in loading the retort vessel, where the basket support bridge has one free end that moves bot vertically and horizontally during pivot. Notably, this pivotable system enables the free end of the rail portions 62 and channel portion 48 to move partially within the vessel (if desired) when lowered to closely align with the channel portion and rail portions within the vessel. However, rail portions 62 and channel portion 48 may also terminate external of the vessel, leaving a small gap that is readily traversed by the baskets and the rigid chain unit during load/unload operations.

Figure 8:
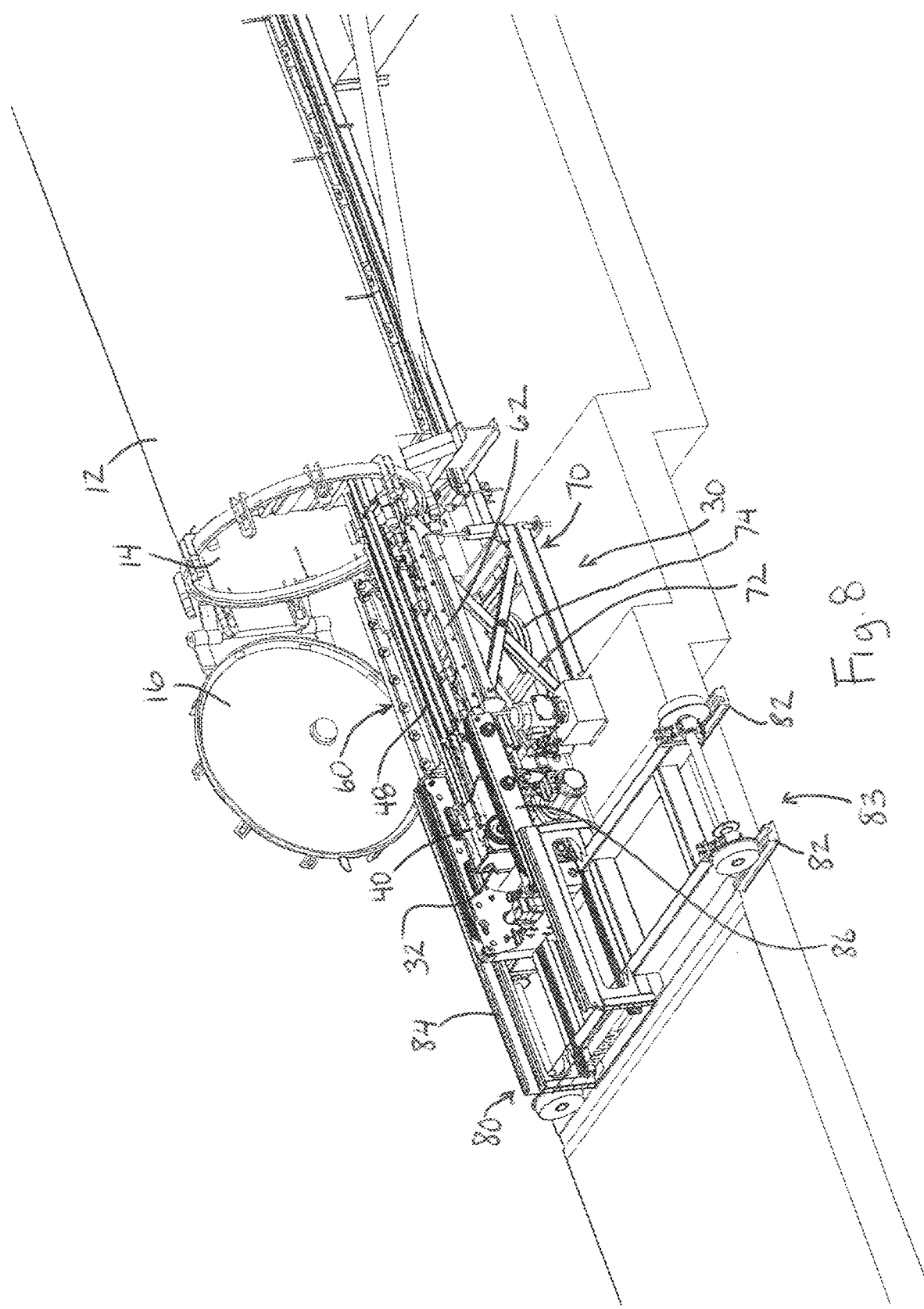
FIG. 8 shows a partial perspective another embodiment of a basket load/unload system at the load side of a retort vessel.
Figure 9:
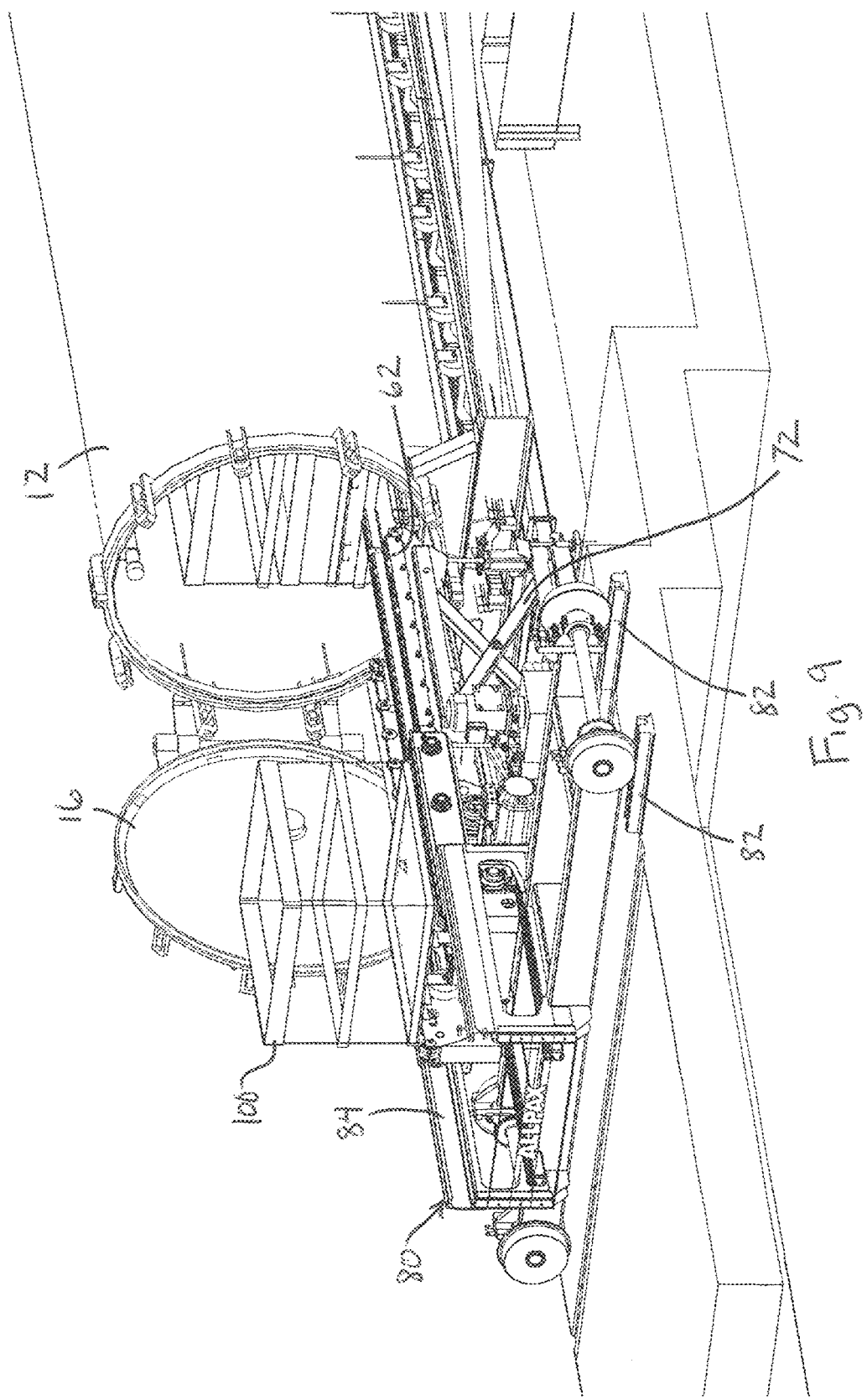
FIG. 9 shows the system of FIG. 8 with a container basket.
Figure 10:
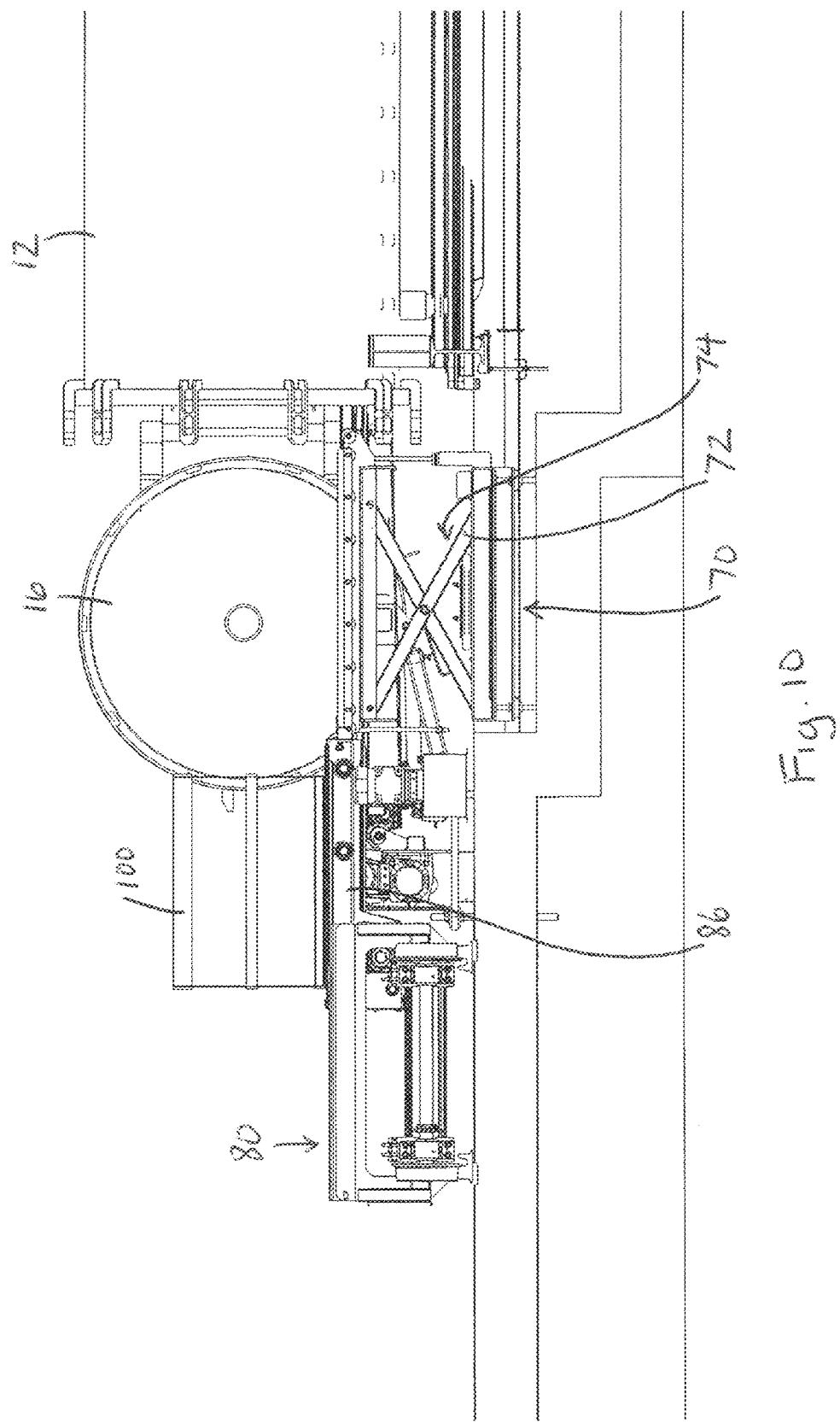
FIG. 10 is a side elevation of FIG. 9.

In another embodiment reflected in FIGS. 8-10, the channel portion 48 and rail portions 62 are mounted to a vertically movable frame in the form of a lift device 70 that raises and lowers the portions. Here, the lift device 70 forms a common actuation assembly that includes a scissor-lift type system 72 and an actuator such as a linear actuator or an air bag lift mechanism 74, but other variations are possible. The lift frame, channel portion and rail portions collectively can be considered a vertically movable basket support bridge, where both ends of the basket support bridge move vertically. When the lift device is raised, the channel and rail portions align with those in the vessel (and may also be extended laterally slightly to move partly within the vessel if desired), and when the lift device is lowered, the channel and rails portions move below the access opening 14 so that the door 16 can open and close. Thus, lowered position would be the retracted position in this embodiment.

As also seen in FIGS. 8-10, the container load/unload system may also include a shuttle mechanism 80 aligned or alignable with the spaced apart basket support rails for transferring container baskets onto the spaced apart basket support rail members. In this regard, the illustrated shuttle mechanism may be movable along a rail line 83 formed by shuttle rails 82 into the desired position for retort loading, and a main frame 84 includes a laterally extendable feed table 86 (e.g., formed as spaced apart free rails) that moves over the rigid chain unit to align with the rail portions 62. Thus, in the illustrated embodiment the container baskets move over the rigid chain unit 32, including chain feed mechanism 40, during transfer from the shuttle mechanism 80 to the spaced apart basket support rails 62. The same shuttle mechanism can also be incorporated into the embodiment of FIGS. 1-7.

Figure 11:
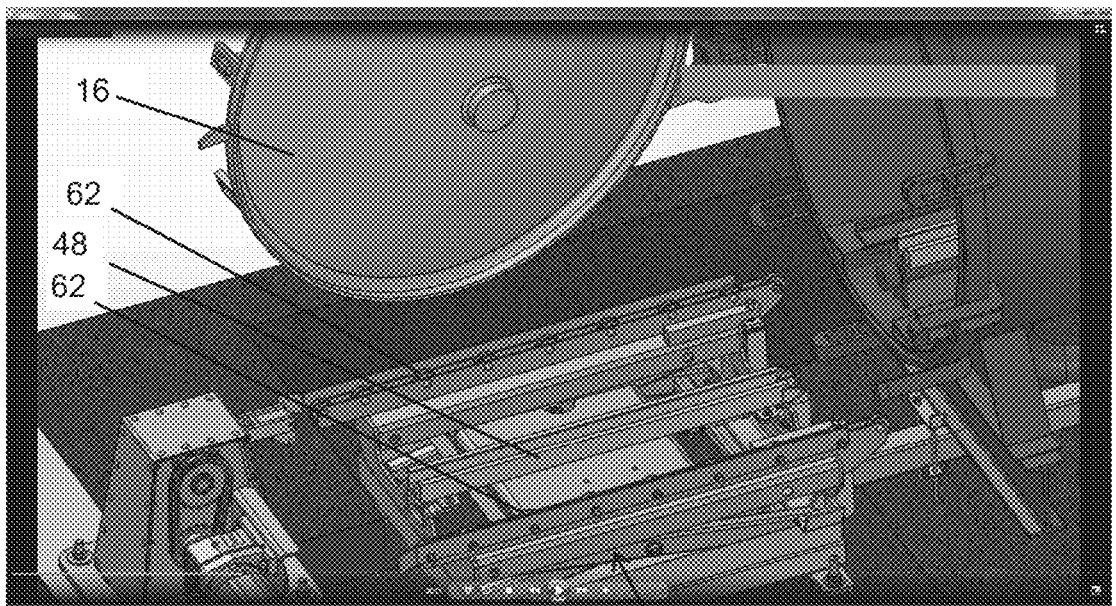
Figure 12:
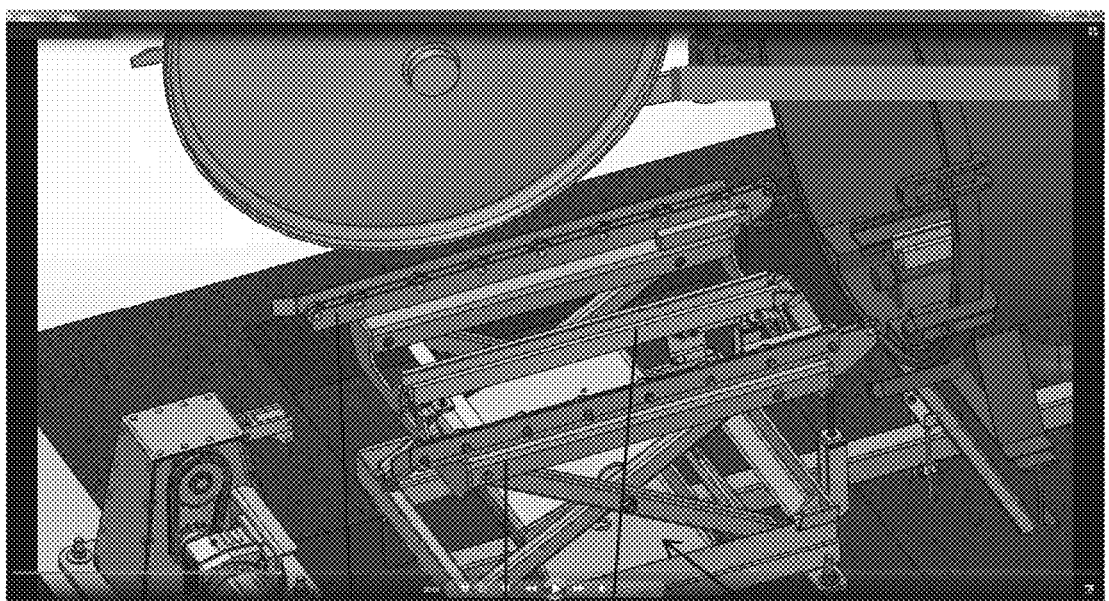
Figure 15:
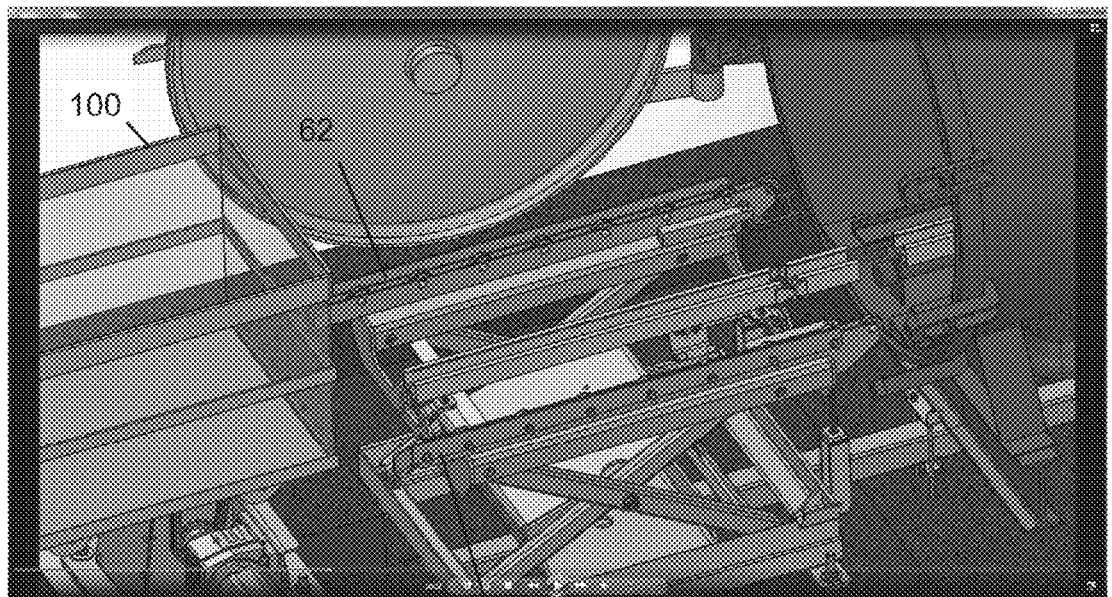
Figure 16:
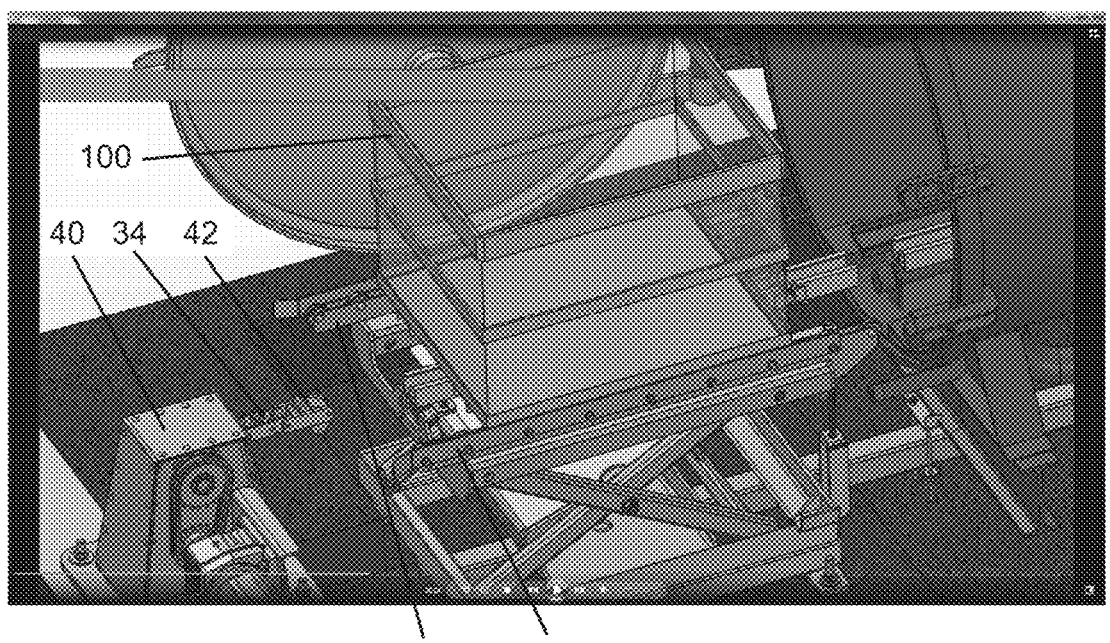
Figure 17:
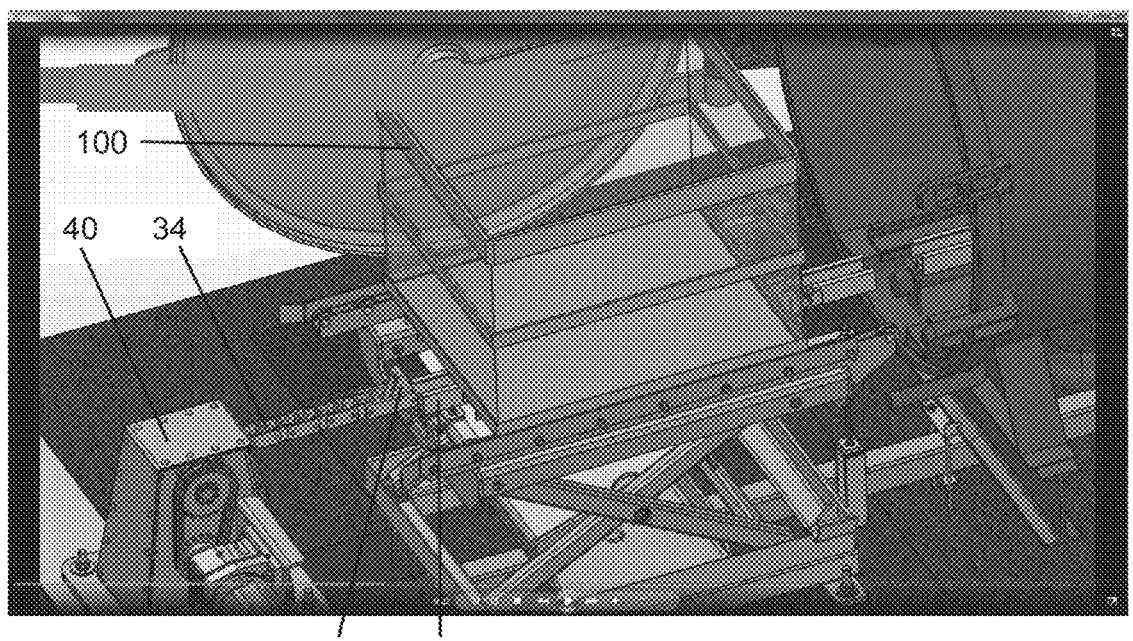
Figure 18:
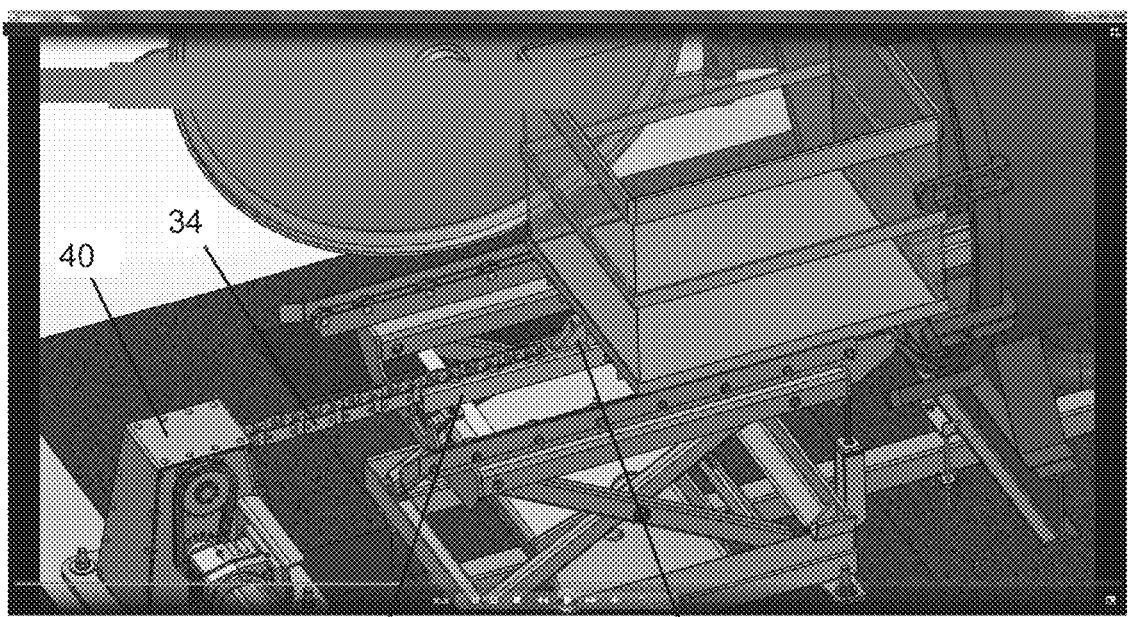
Figure 19:
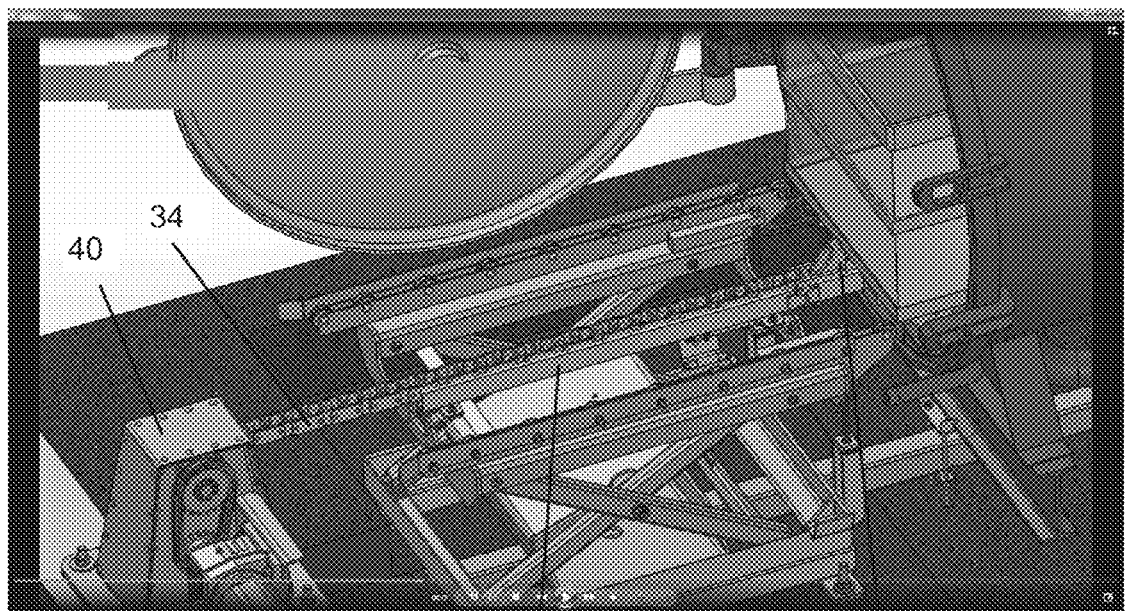
Figure 20:
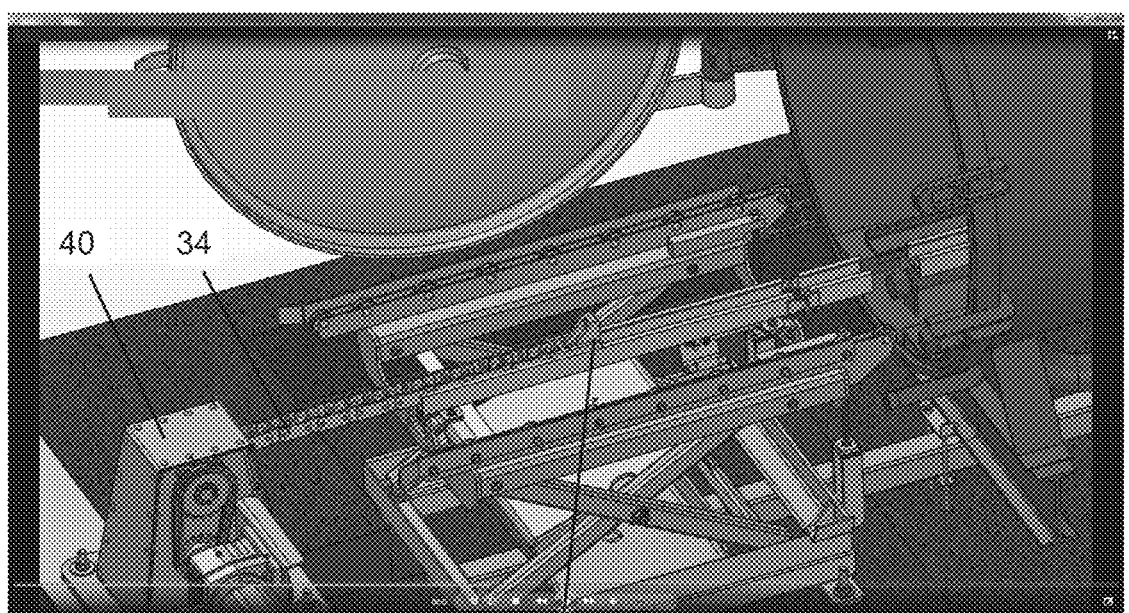
Figure 21:
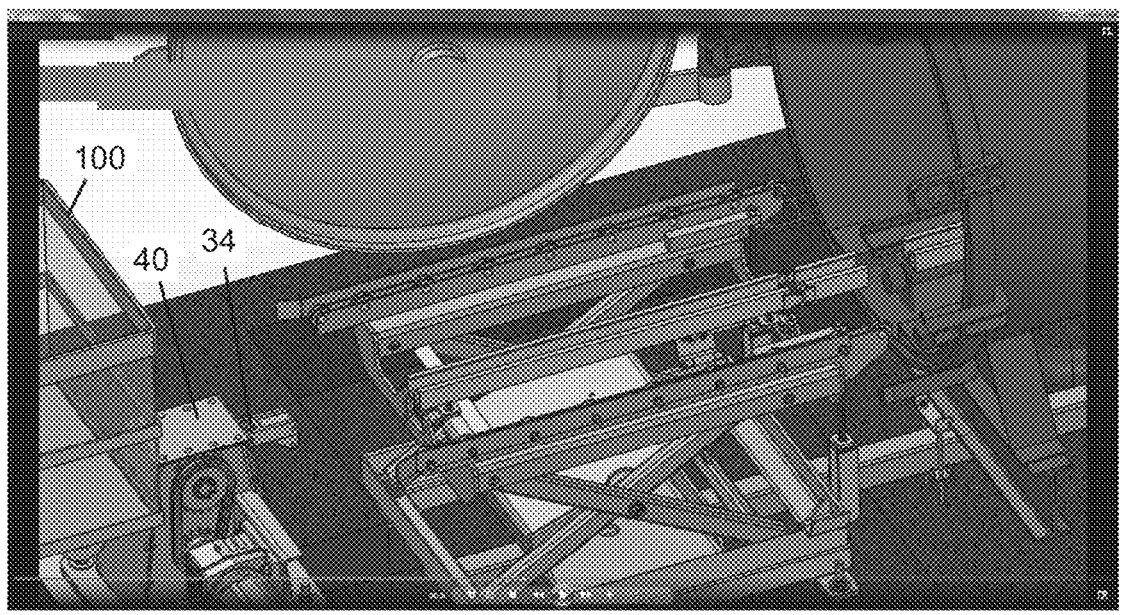
Figure 22:
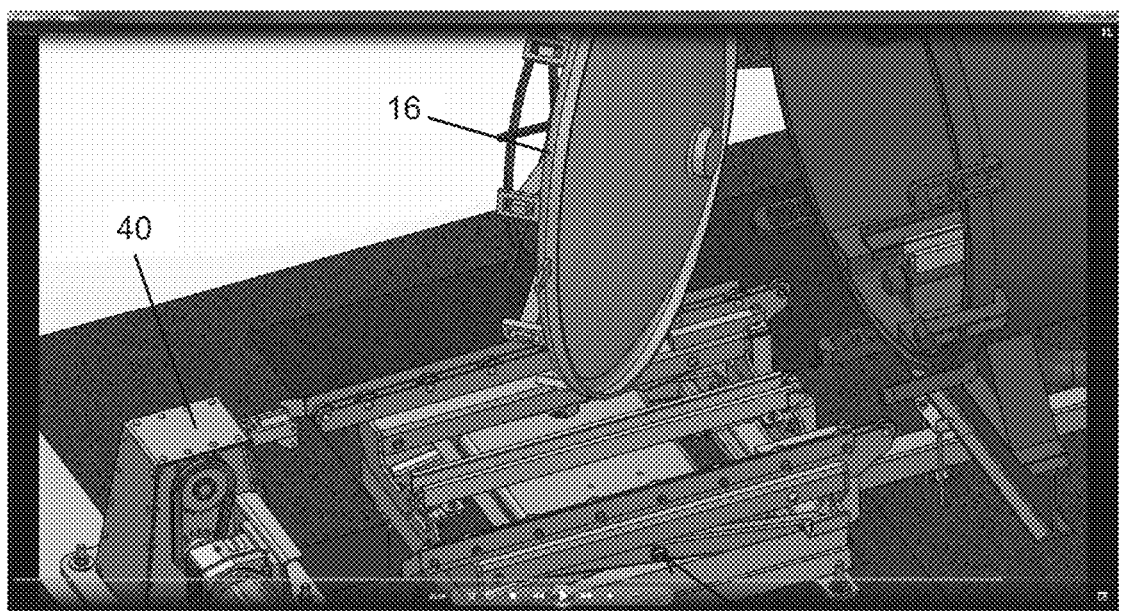

An exemplary retort load process is shown in FIGS. 11-22 for the scissor-lift type embodiment and described below, where parentheticals are added to described a corresponding operation of the pivoting frame embodiment. In FIG. 11, the lift device 70 is in a lowered position and the vessel door 16 is open (in the pivoting embodiment the frame would be raised to the position of FIG. 4). In FIGS. 12-14 the lift device 70 is raised to move the exterior channel portion 48 and exterior basket support rail portions 62 into position (in the pivoting embodiment the frame would be pivoted downward into the load/unload position). Notably, per FIGS. 13 and 14 the exterior channel segment 48 may include a pivotable end segment. In FIGS. 15-16 a container basket 100 is transferred onto the exterior rail portions 62 (the same would for the pivoting embodiment, not that the shuttle mechanism is not shown). In FIGS. 16-19 the rigid chain 34 is extended by chain feed mechanism 40 to push the container basket into the vessel (the same would occur for the pivoting embodiment). Notably, the free end of the rigid chain 34 includes a pusher block 42 that pivots from a lowered position (e.g., basket bypass position in FIG. 16) to a raised position (e.g., basket push position of FIG. 17) when the block contacts the entry end of exterior channel portion 48. In FIGS. 20-21 the rigid chain 34 is retracted (the same would occur for pivoting embodiment). Notably, the pusher block 42 pivots back down to its lowered position when retracted from the channel portion 48 to enable a next basket to pass freely over the top. The steps depicted by FIGS. 15-21 are repeated according to the number of container baskets to be loaded into the vessel. In one example, a first container basket moved into the vessel is moved to an axial depth at the far end of the vessel, a second container basket is moved to a shorter axial depth alongside the first container basket, a third container basket is moved to an even shorter axial depth alongside the second container basket, and so on for all container baskets that are loaded. This version avoids the need for the rigid chain unit to push all container baskets simultaneously. However, an alternative embodiment could be implemented where each container basket is loaded into the same axial depth slightly inward of the access opening 14, and in such embodiment each subsequently loaded container basket would engage the previously loaded basket and push it (an any other container baskets in the vessel) further into the vessel. Once the vessel is fully loaded, in FIG. 22 the lift device 70 is lowered and the vessel door 16 is closed (for the pivoting embodiment the frame would pivot upward to enable closure of the door).

To unload the retort vessel, the door 20 at the far end of the vessel could be opened, and the rigid chain extended to push all of the container baskets out of the far end of the vessel. In this regard, in one embodiment the rigid chain unit can engage and push the container basket at the load side of the vessel to push the container basket at the unload side of the vessel out, and continue the extension of the rigid chain each time the unload side of the vessel is clear and able to receive another container basket. Thus, a single extension of the rigid chain through the vessel (albeit intermittently) can achieve the complete unloading operation. Thus, the rigid chain unit may be configured to enable a push end of the rigid chain to be moved along the chain feed path into the vessel via the access opening 14, entirely through the vessel and out of the access opening 18. In this regard, the system may include a chain storage channel 88 that runs beneath the vessel and store the rigid chain when it is retracted from the vessel. However, other suitable chain storage systems are also possible. In another embodiment, the rigid chain unit may be sequentially extended and retracted for the unload operation. In some embodiments, the same access opening 14 could be used to both load and unload vessels, as a typical rigid chain unit also facilitates a pull function in addition to the described push function. To achieve this variation the distal end of the rigid chain unit could have a container pull mechanism temporarily attached so as to engage, latch and capture a container basket for the pull operation.

Thus, the system provided advantageous methods.

For example, a method of loading a retort vessel with one or more container baskets involves (a) positioning a container basket at a location exterior of a vessel and in alignment with an access opening at one end of the vessel; (b) extending a rigid chain toward the container basket to cause a basket push block to engage with the first container basket and move the first container basket toward the access opening, through the access opening and into the vessel; and (c) retracting the rigid chain from the vessel. Steps (a), (b) and (c) may be repeated for additional container baskets as needed. In initial step (b) the initial container basket may be moved to a first axial depth along the vessel, and in a second step (b) the second additional container basket may be moved to a second axial depth along the vessel, where the second axial depth is shorter than the first axial depth. In this method each container basket is pushed fully into the vessel (e.g., as far as possible) before a next container basket is loaded. The rigid chain may move within a chain guide channel having a portion exterior of the vessel and a portion interior of the vessel (e.g., when the chain is extended for loading) and in step (c) the rigid chain may move within a chain storage channel running below the vessel. Where the shuttle mechanism described above is used and a rigid chain feed mechanism is located exterior of the vessel, in step (a) the container basket is moved over the rigid chain feed mechanism.

In another example, a method of retort operation involves: (a) loading multiple container baskets into a retort vessel utilizing a rigid chain that feeds from a position exterior of the retort vessel and into the retort vessel; (b) closing the retort vessel; (c) heating containers within the multiple container baskets within the retort vessel; (d) opening the retort vessel; and (e) unloading the multiple container baskets from the retort vessel utilizing the rigid chain. In step (a) container baskets may be loaded into the retort vessel one at a time by sequential extension and retraction of the rigid chain. In step (e) container baskets may unloaded from the retort vessel one at a time by sequential extension and retraction of the rigid chain. In one implementation, in step (a) container baskets may be pushed into a first end of the retort vessel by extension of the rigid chain, and in step (e) container baskets may be pushed out of a second end of the retort vessel by extension of the rigid chain. In another implementation in step (a) container baskets may be pushed into a first end of the retort vessel by extension of the rigid chain, and in step (e) container baskets may be pulled out of the first end of the retort vessel by retraction of the rigid chain.

Referring now to FIG. 23, an exemplary retorting system 200 is shown, and include a retort load side 204 and a retort unload side 202. Multiple retort vessels 12 are arranged side-by-side, and each has its own corresponding movable basket support bridge and rigid chain unit (e.g., 30) at its load side. The vessels 12 are all located along the rail line 83 so that the shuttle mechanism 80 can be moved into position for loading any of the vessels. Basket support bridges are also located at the exit side of each vessel to receive container baskets as they are pushed out of the exit side of the retort vessels by the rigid chain unit at the inlet side, and an unload side shuttle mechanism may also be provided.

It is to be clearly understood that the above description is intended by way of illustration and example only, is not intended to be taken by way of limitation, and that other changes and modifications are possible.

For example, while the above embodiment depicts loading of one container basket at a time, in some embodiments more than one container basket could be pushed from the exterior of the retort vessel into the interior of the retort vessel simultaneously.

As another example, a rigid chain pusher could be incorporated into a shuttle mechanism, eliminating the need for a rigid chain unit at the load side of each retort vessel of a grouped system. In this regard, and referring to FIG. 8, the rigid chain unit 40 could be mounted to the shuttle 80. In one example, the rigid chain unit could be mounted centrally within the main frame 84 beneath the normal location of a conveyor basket carried by the shuttle 80 as it moves along the rail line 83. In this example, the rigid chain unit 40 would remain in a fixed position when the feed table 86 is moved laterally, and the feed table could incorporate a segment of the chain guide channel that also moves with the feed table 86. In another embodiment, the rigid chain unit 40 could be mounted to the movable feed table 86 for movement with the feed table as it moves laterally. In either embodiment, where the feed table 86 is capable of sufficient lateral extension, in some installations it may be possible to eliminate the separate basket support bridge at the load side of the retort vessel (e.g., the feed table 86 may act as the basket support bridge with movable rail portions that may move slightly into the retort vessel when extended into a load/unload position and that retract to enable closure of the vessel door). Moreover, where the shuttle rail line is located in close proximity to the load end of the retort vessels, as may be the case for retort vessels that include doors that move in a vertical plane, the shuttle mechanism need not include a movable feed table at all, and both the rigid chain as well as the baskets can traverse the relatively small gap between the shuttle structure (e.g., the chain guide on the rigid chain unit in the case of the chain, or the basket support rails on the shuttle in the case of baskets) and the retort vessel structure (e.g., the chain guide within the vessel in the case of the chain, or the basket support rails in the vessel in the case of the baskets).

Moreover, while the primary embodiment described above utilizes a chain channel guide that surrounds the chain at bottom, left and right sides, and potentially partially at the chain top, it is recognized that embodiments without a surrounding chain channel guide are possible where the chain links include a locking feature that, alone, are sufficient to keep the chain linear during a horizontal push operation. In such cases it may be suitable, for example, to simply provide a chain channel guide that is nothing more than an elongated planar surface that runs horizontally along the chain travel path. In some embodiments elimination of the chain guide channel entirely may be possible, such as in the case of retort vessels of relatively short axial length.

Other variations and modifications are also possible.

What is claimed is:

1. A retort system, comprising:
   a vessel having an access opening accessible via a movable door;
   a basket supporting assembly within the vessel and along which container baskets are movable for loading into the vessel and unloading from the vessel;
   a heating system for heating containers for treatment within the vessel;
   a container basket load/unload system for moving container baskets into the vessel and for moving container baskets out of the vessel, the system including:
      a rigid chain unit aligned with the access opening such that a rigid chain can be moved along a chain feed path into the vessel via the access opening.

2. The retort system of claim 1 wherein:
   the rigid chain unit includes:
      a chain feed mechanism;
      a pusher block disposed proximate a push end of the rigid chain, wherein the pusher block is pivotably connected to the rigid chain for movement between a basket push position and a basket bypass position.

3. The retort system of claim 1 wherein the rigid chain remains linear when extended and bends as it is retracted into a housing of the rigid chain unit.

4. The retort system of claim 2 wherein the container basket load/unload system further includes a chain guide channel running along the chain feed path from a position exterior of the vessel and into the vessel.

5. The retort system of claim 4 wherein the chain guide channel interacts with the rigid chain to maintain a portion of the rigid chain that is within the chain guide channel substantially linear.

6. The retort system of claim 4 wherein the chain guide channel includes a first channel portion located primarily exteriorly of the vessel and a second channel portion located within the vessel.

7. The retort system of claim 6 wherein the container basket load/unload system includes spaced apart basket support rail lines running parallel to the chain feed path, each basket support rail line running from a position exterior of the vessel and into the vessel.

8. The retort system of claim 7 wherein each basket support rail line includes a first rail portion located primarily exteriorly of the vessel and a second rail portion located within the vessel.

9. The retort system of claim 8, wherein the first channel portion is movable between a load/unload position that prevents closure of the door of the vessel and a retracted position that permits closure of the door of the vessel, wherein the first rail portion is movable between a load/unload position that prevents closure of the door of the vessel and a retracted position that permits closure of the door of the vessel.

10. The retort system of claim 9 wherein each of the first rail portions and the first channel portion are movable by a common actuation assembly.

11. The retort system of claim 10 wherein the common actuation assembly moves a pivotable frame to which the first rail portions and the first channel portion are mounted.

12. The retort system of claim 10 wherein the common actuation assembly lowers the first rail portions and the first channel portion to achieve the respective retracted positions.

13. The retort system of claim 10 wherein the common actuation assembly pivots the first rail portions and the first channel portion upward to achieved the respective retracted positions.

14. The retort system of claim 8 wherein the first rail portions and the first channel portion are mounted on a shuttle that is movable into and out of alignment with the access opening.

15. The retort system of claim 1 wherein:
   the access opening is a first access opening at a first end of the vessel;
   the vessel includes a second access opening at an opposite end of the vessel; and
   the rigid chain unit is configured with a length sufficient to enable a push end of the rigid chain to be moved along the chain feed path into the vessel via the first access opening, entirely through the vessel and out of the second access opening.

16. The retort system of claim 1 wherein:
   the rigid chain unit includes a chain storage channel that runs beneath the vessel.

17. The retort system of claim 1 wherein:
   the container basket load/unload system includes:
      spaced apart basket support rail members exterior of the vessel and running parallel to the chain feed path;
      a shuttle aligned or alignable with the spaced apart basket support rail members for transferring container baskets onto the spaced apart basket support rail members.

18. The retort system of claim 17 wherein container baskets move over the rigid chain unit during transfer from the shuttle to the spaced apart basket support rails.

19. The retort system of claim 1, wherein:
   the container basket load/unload system includes:
      a movable shuttle alignable with the access opening, and the rigid chain unit is mounted to the movable shuttle mechanism.

20. The retort system of claim 19, wherein:
   the vessel is a first vessel of the retort system, and multiple other vessels are positioned alongside the first vessel, and the shuttle is movable into alignment with each of the multiple other vessels such that the rigid chain unit is selectively positionable for loading/unloading each of the multiple other vessels.

21. A retort system, comprising:
   a plurality of retort vessels positioned side-by-side, each retort vessel having an access opening accessible via a movable door of the retort vessel;
   at least one rigid chain unit for loading and unloading the plurality of retort vessels wherein the at least one rigid chain unit has a rigid chain with a free end that is feedable from a position exterior of at least one of the retort vessels to a position within the at least one retort vessel so as to operate as a push end of the rigid chain for loading container baskets into the at least one retort vessel.

22. The retort system of claim 21 wherein a separate rigid chain unit is provided for each retort vessel, each rigid chain unit positioned exterior of a respective one of the retort vessels and oriented such that a rigid chain can be moved along a chain feed path into the respective one of the retort vessels via the access opening of the respective one of the retort vessels.

23. The retort system of claim 21 wherein a single rigid chain unit is provided for the plurality of retort vessels, the single rigid chain unit mounted to a shuttle that is movable along a path that traverses the access openings of the plurality of retort vessels.

24. A retort system, comprising:
a vessel having an access opening accessible via a movable door;
a basket supporting assembly within the vessel and along which container baskets are movable for loading into the vessel and unloading from the vessel;
a heating system for heating containers for treatment within the vessel;
a container basket load/unload system for moving container baskets into the vessel and for moving container baskets out of the vessel, the system including:
a rigid chain unit that is (i) located at a load/unload position aligned with the access opening or (ii) movable to the load/unload position, wherein, in the load/unload position, the rigid chain unit is spaced from the access opening to permit opening and closing of the movable door and a rigid chain of the rigid chain unit is external of the vessel.

* * * * *